US011481359B2

(12) United States Patent
Kaddoura

(10) Patent No.: US 11,481,359 B2
(45) Date of Patent: Oct. 25, 2022

(54) PARALLEL DISTRIBUTED LEDGER CONSTRUCTION

(71) Applicant: ARCHITECTURE TECHNOLOGY CORPORATION, Eden Prairie, MN (US)

(72) Inventor: Maher N. Kaddoura, Maple Grove, MN (US)

( * ) Notice: Subject to any disclaimer, the term of this patent is extended or adjusted under 35 U.S.C. 154(b) by 38 days.

(21) Appl. No.: 17/039,323

(22) Filed: Sep. 30, 2020

(65) Prior Publication Data

US 2021/0182244 A1 Jun. 17, 2021

Related U.S. Application Data

(60) Provisional application No. 62/947,428, filed on Dec. 12, 2019.

(51) Int. Cl.
*G06F 16/00* (2019.01)
*G06F 16/182* (2019.01)

(52) U.S. Cl.
CPC .................. *G06F 16/1834* (2019.01)

(58) Field of Classification Search
CPC .................................. G06F 16/1834
See application file for complete search history.

(56) References Cited

U.S. PATENT DOCUMENTS

| | | | |
|---|---|---|---|
| 10,616,324 B1 | 4/2020 | Kaddoura | |
| 2019/0019180 A1 | 1/2019 | Coburn et al. | |
| 2019/0303622 A1* | 10/2019 | Versteeg | H04L 9/3239 |
| 2019/0373521 A1 | 12/2019 | Crawford | |
| 2020/0394162 A1* | 12/2020 | Iizuka | H04L 9/3239 |
| 2021/0104326 A1* | 4/2021 | Lorenzo | G06N 20/10 |
| 2021/0109797 A1* | 4/2021 | Zhou | G06Q 20/42 |
| 2021/0176038 A1* | 6/2021 | Bortnikov | G06F 9/54 |
| 2021/0334244 A1* | 10/2021 | Takahashi | G06Q 20/401 |

OTHER PUBLICATIONS

"Non-Final Office Action", U.S. Patent and Trademark Office, U.S. Appl. No. 16/946,230, filed Oct. 25, 2021, 9 pgs.
Weston et al., Performance of blockchain technology on DoD tactical networks, May 2019, SPIE, All pages (Year: 2019).
"Final Office Action", U.S. Patent and Trademark Office, U.S. Appl. No. 16/946,230, filed Mar. 18, 2022, 7 pgs.
"Final Office Action", U.S. Patent and Trademark Office, U.S. Appl. No. 16/946,230, filed May 9, 2022, 8 pgs.

* cited by examiner

*Primary Examiner* — Ashish Thomas
*Assistant Examiner* — Suman Rajaputra
(74) *Attorney, Agent, or Firm* — Carlson, Caspers, Vandenburgh & Lindquist, P.A.

(57) ABSTRACT

Software generates a ledger fragment by generating a first block having first data in a first record data field, a nonce value in a first previous block pointer field, and a first hash in a first hash field. Generating the ledger fragment also includes generating a second block having second data in a second record data field, the first hash in a second previous block pointer field, and a second hash in a second hash field. The ledger fragment is appended to a main ledger with a linking block. The linking block is positioned between the first block of the ledger fragment and an end block of the main ledger. The linking block includes a third hash from the end block in a fourth previous block pointer field and the nonce value in a fourth hash field. The linking block is signed by a plurality of voting peers.

21 Claims, 10 Drawing Sheets

PARALLEL DISTRIBUTED LEDGER CONSTRUCTION

RELATED APPLICATIONS

This application claims the benefit of U.S. Provisional Application No. 62/947,428 filed on Dec. 12, 2019, entitled "SCALABLE AND RELIABLE BLOCKCHAIN FOR LOW BANDWIDTH AND UNSTABLE NETWORKS", which is hereby incorporated herein by reference.

GOVERNMENT CONTRACTS

This invention was made with government support under contract W56KGU-19-C-0037 awarded by the U.S. Army. The government may have certain rights in the invention.

BACKGROUND

Distributed ledger protocols constitute the underlying technology for developing Peer-to-Peer (P2P) databases, which possess three attributes that traditional databases lack: 1) disintermediation: data is available to all the nodes; 2) high fault tolerance: the database will continue to operate even if a large percentage of its nodes are disabled; 3) immutability: it is impossible to falsify data once it is committed to the database. Current distributed ledger systems fail, however, when deployed in low-bandwidth and disconnected-network environments, such as tactical networks.

BRIEF DESCRIPTION

Embodiments for a program product comprising a non-transitory processor readable medium having software stored thereon are provided. The software, when executed by one or more processing devices, is configured to generate a ledger fragment. The ledger fragment is generated by generating a first block having first data in a first record data field, a nonce value in a first previous block pointer field, and a first hash in a first hash field, wherein the first hash is calculated based on the first data and the nonce value. Generating the ledger fragment also includes generating a second block having second data in a second record data field, the first hash in a second previous block pointer field, and a second hash in a second hash field, wherein the second hash is calculated based on the second data and the second hash. The ledger fragment is appended to a main ledger. The main ledger includes a plurality of blocks in a sequence defining an end block at an end of the sequence, the end block having third data in a third record data field, a third previous block pointer field, and a third hash that is calculated based on the third record data. Appending the ledger fragment to the main ledger includes generating a linking block. The linking block is positioned between the first block of the ledger fragment and the end block of the main ledger. The linking block includes the third hash in a fourth previous block pointer field and the nonce value in a fourth hash field. The linking block is signed by a plurality of voting peers.

Embodiments for a device having one or more processing devices and storage media communicatively coupled to the one or more processing devices are also provided. The storage media includes software stored thereon. The software, when executed by the one or more processing devices is configured to generate a ledger fragment. The ledger fragment is generated by generating a first block having first data in a first record data field, a nonce value in a first previous block pointer field, and a first hash in a first hash field, wherein the first hash is calculated based on the first data and the nonce value. Generating the ledger fragment also includes generating a second block having second data in a second record data field, the first hash in a second previous block pointer field, and a second hash in a second hash field, wherein the second hash is calculated based on the second data and the second hash. The ledger fragment is appended to a main ledger. The main ledger includes a plurality of blocks in a sequence defining an end block at an end of the sequence, the end block having third data in a third record data field, a third previous block pointer field, and a third hash that is calculated based on the third record data. Appending the ledger fragment to the main ledger includes generating a linking block. The linking block is positioned between the first block of the ledger fragment and the end block of the main ledger. The linking block includes the third hash in a fourth previous block pointer field and the nonce value in a fourth hash field. The linking block is signed by a plurality of voting peers.

Embodiments for a method for constructing a ledger. The method includes sending data to be committed to the ledger to a plurality of block building peers. A first ledger fragment is generated at a first of the plurality of block building peers and a second ledger fragment is generated at a second of the plurality of block building peers. The first ledger fragment captures a first portion of the data and the second ledger fragment captures a second portion of the data. Each of the first and second ledger fragments include an initial block having first data in a first record data field, a nonce value in a first previous block pointer field, and a first hash in a first hash field, wherein the first hash is calculated based on the first data and the nonce value. Each of the first and second ledger fragments also include one or more additional blocks. Each additional block having respective data in a respective record data field, a hash of a prior block in a respective previous block pointer field, and its own hash in a respective hash field, wherein its own hash is calculated based on the respective data and the respective hash of the prior block. The first and second ledger fragments are appended to a main ledger. The main ledger includes a plurality of blocks in a sequence defining an end block at an end of the sequence. The end block having third data in a third record data field, a third previous block pointer field, and a third hash that is calculated based on the third record data. Appending the first ledger fragment includes generating a first linking block. The first linking block is positioned between the initial block of the first ledger fragment and the end block of the main ledger. The first linking block includes the third hash in a fourth previous block pointer field and the nonce value from the hash field of the initial block of the first ledger fragment in a fourth hash field. The first linking block is signed by a plurality of voting peers. Appending the second ledger fragment includes generating a second linking block. The second linking block positioned between the initial block of the second ledger fragment and a current end block of the current main ledger. The second linking block including a hash from the current end block in a fifth previous block pointer field and the nonce value from the hash field of the initial block of the second ledger fragment in a fourth hash field. The second linking block is signed by a plurality of voting peers.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
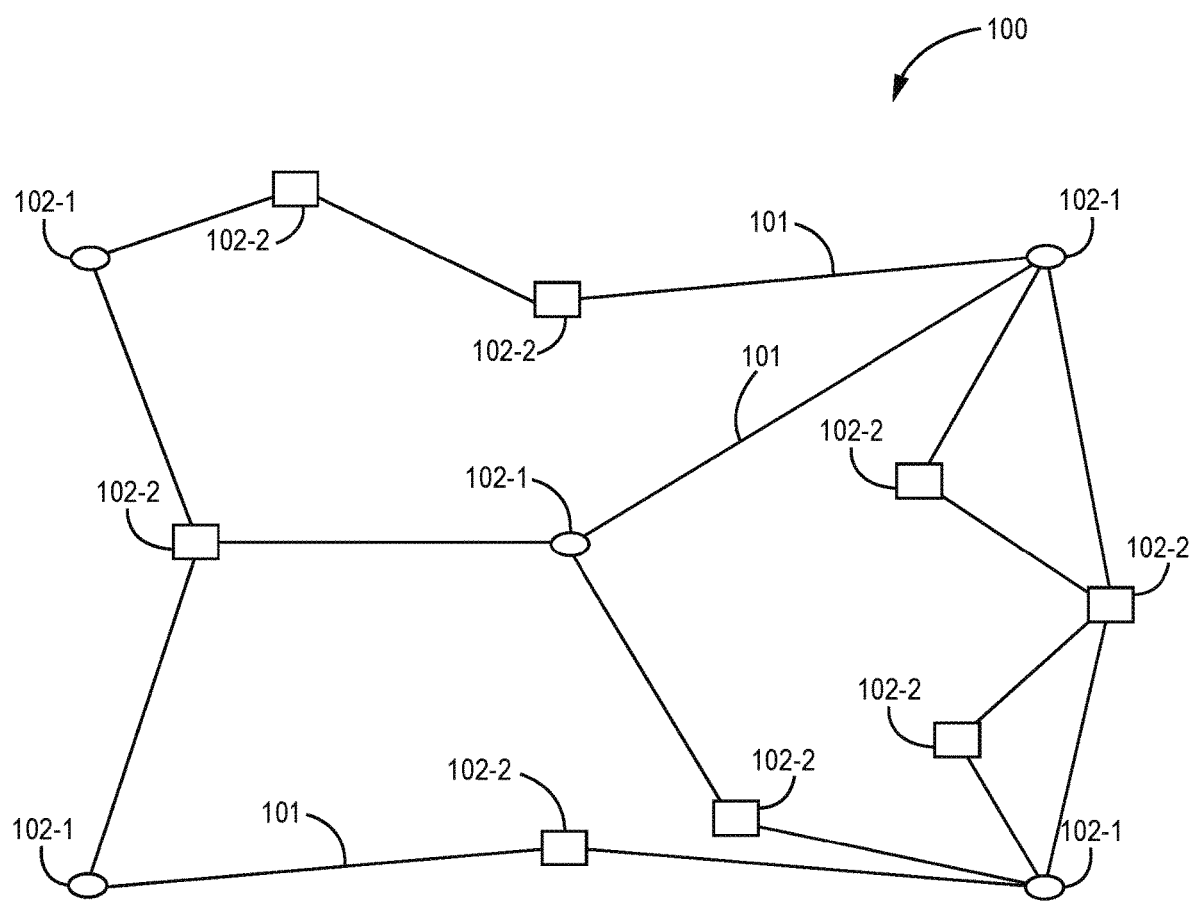
FIG. 1 is a block diagram of an example network that implements a P2P distributed ledger database that accounts for low-bandwidth and unstable network links.

FIG. 1 is a block diagram of an example network 100 that implements a P2P distributed ledger database that accounts for low-bandwidth and unstable network links. In an example, the distributed ledger is a blockchain. FIG. 1 includes a plurality of nodes that are communicatively coupled together via a plurality of network links 101. Each network link 101 can be a physical link implemented over one or more physical communication media (e.g., an Ethernet cable such as a cat-SE compliant cable) or can be a wireless link implemented using wireless signals. All or a portion of network 100 can communicate information via packets that conform to the internet protocol (IP) and/or can communicate information via a non-IP protocol (e.g., IPX, AppleTalk, NetBEUI).

The network nodes 102 can include ledger peers 102-1 and non-ledger peers 102-2. Ledger peers 102-1 are nodes that are members of a set, which implements a common ledger protocol to communicate messages amongst the ledger peers 102-1 in order to create and maintain one or more distributed ledgers. In an example, each ledger peer 102-1 obtains a copy of the one or more ledgers maintained by the set of ledger peers 102-1. Non-ledger peers 102-2 are nodes that communicate in the network 100, but do not implement the ledger protocol of the ledger peers 102-1. The ledger peer nodes 102-1 and non-ledger peer nodes 102-2 can be any device capable of communicating with other nodes 102 in the network 100. This includes a mobile device such as a mobile phone, laptop, communications radio (e.g., tactical radio), a radio platform for installation in heavy equipment (e.g., military equipment, construction equipment), a wireless wearable device, or a wireless sensor. This also includes manned and unmanned vehicles with communication capabilities, such as heavy equipment, an automobile, an aircraft, or watercraft. This also includes networking devices such as a hub, switch, or router. Each ledger peer 102-1 includes ledger software to implement the ledger protocol thereon.

The plurality of nodes 102 implement one or more network protocols (e.g., IP) to effectuate communication amongst one another through the network 100. In an example, the network 100 sends IP packets to communicate information through the network 100. The ledger protocol implemented by the ledger peers 102-1 implements an overlay network protocol that controls communication of ledger messages/information amongst the ledger peers 102-1. The overlay network protocol operates on top of the (regular) network protocol(s). That is, the overlay network protocol communicates ledger messages/information amongst the ledger peers 102-1 by sending the ledger messages/information via the packets of the regular network protocols thereby using both ledger nodes 102-1 and non-ledger nodes 102-2 of the network 100 to transport the ledger messages/information amongst the ledger peers 102-1.

The overlay network protocol monitors overlay network links between ledger peers 102-1 and implements aspects of the ledger protocol based on the characteristics of the overlay network links. An overlay network link (also referred to herein as simply an "overlay link") is a logical communication path between two ledger peers 102-1. An overlay link starts at a first ledger peer 102-1 and ends at a second ledger peer 102-1. The overlay network protocol can send a ledger message/information over an overlay link to communicate that message/information from one ledger peer 102-1 to another ledger peer 102-1. The overlay link can include a single (regular) network link directly coupling the first ledger peer 102-1 to the second ledger peer 102-2 or the overlay link can include multiple regular network links such that the overlay link traverses one or more intermediate non-ledger nodes 102-2. Accordingly, a packet corresponding to a ledger message/information can hop through one or more non-ledger nodes 102-2 as it traverses a single overlay link.

Figure 2:
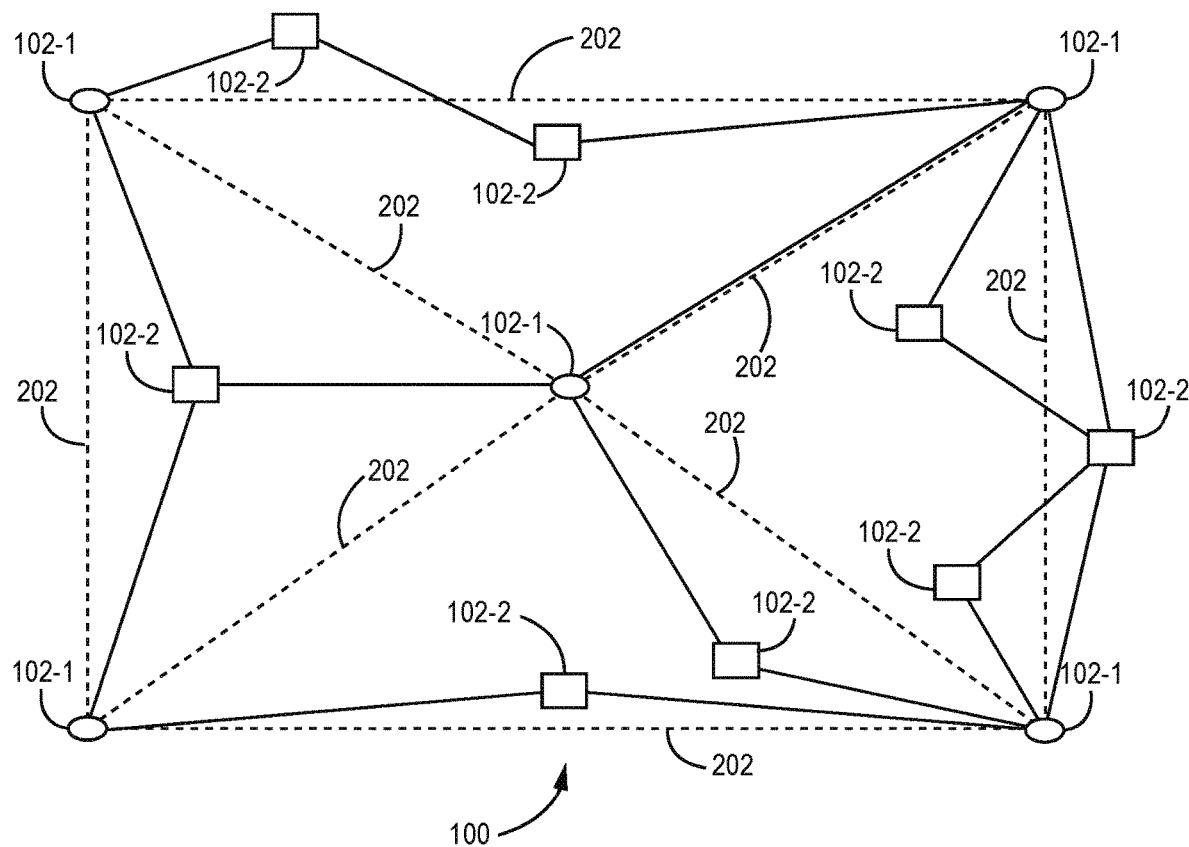
FIG. 2 is a modified version of FIG. 1 illustrating the overlay links between peers.

FIG. 2 is a modified version of FIG. 1 illustrating the overlay network links 202 between ledger peers 102-1. As mentioned above, the overlay network protocol uses the overlay links to send ledger messages/information amongst the ledger peers 102-1. The overlay network protocol can implement an overlay routing protocol to control how ledger messages/information are routed amongst the ledger peers 102-1. To implement such a routing protocol, the overlay network protocol assigns and monitors the overlay network links 202. Assigning an overlay link 202 refers to the act of selecting which two ledger peers 102-1 make up the endpoints of a given overlay link 202. Two ledger peers 102-1 that make up the endpoint of an overlay link 202 are referred to herein as "neighbors". By assigning ledger peers 102-1 as endpoints of specific overlay links 202 the overlay network protocol establishes an overlay network amongst the peers 102-1.

Neighboring peers 102-1 can be assigned based on characteristics of the (regular) network links 104 forming the path between peers 102-1. The overlay network protocol can be configured to set up overlay links such that no ledger peers 102-1 are an intermediary point for an overlay link 202. For example, if a first peer 102-1 is communicatively coupled to a third peer 102-1, but the network path from the first peer 102-1 to the third peer 102-1 travels through a second peer 102-1, the overlay protocol will not assign a overlay link between the first peer 102-1 and the third peer 102-1. Instead, the overlay protocol will assign a first overlay link between the first peer 102-1 and the second peer 102-1, and a second overlay link 202 between the second peer 102-1 and the third peer 102-1.

Other characteristics used can be the stability, bandwidth, whether a network path exists to a peer, and/or packet loss of a network path. For example, if a first peer 102-1 has network paths to multiple other peers 102-1, the overlay protocol can select which of the other peers 102-1 are neighbors based on the stability, bandwidth, and/or packet loss of the network paths between those peers 102-1. That is, the overlay routing protocol can select neighbors having network paths there between with higher stability, bandwidth, and/or lower packet loss. In an example, stability of an overlay link can be a percentage of time the overlay link is disconnected. Additional information regarding an example overlay network and characteristics thereof is provided in co-pending U.S. patent application Ser. No. 16/946,230, titled "P2P OVERLAY FOR DISTRIBUTED LEDGER", which is hereby incorporated herein by reference.

Figure 3:
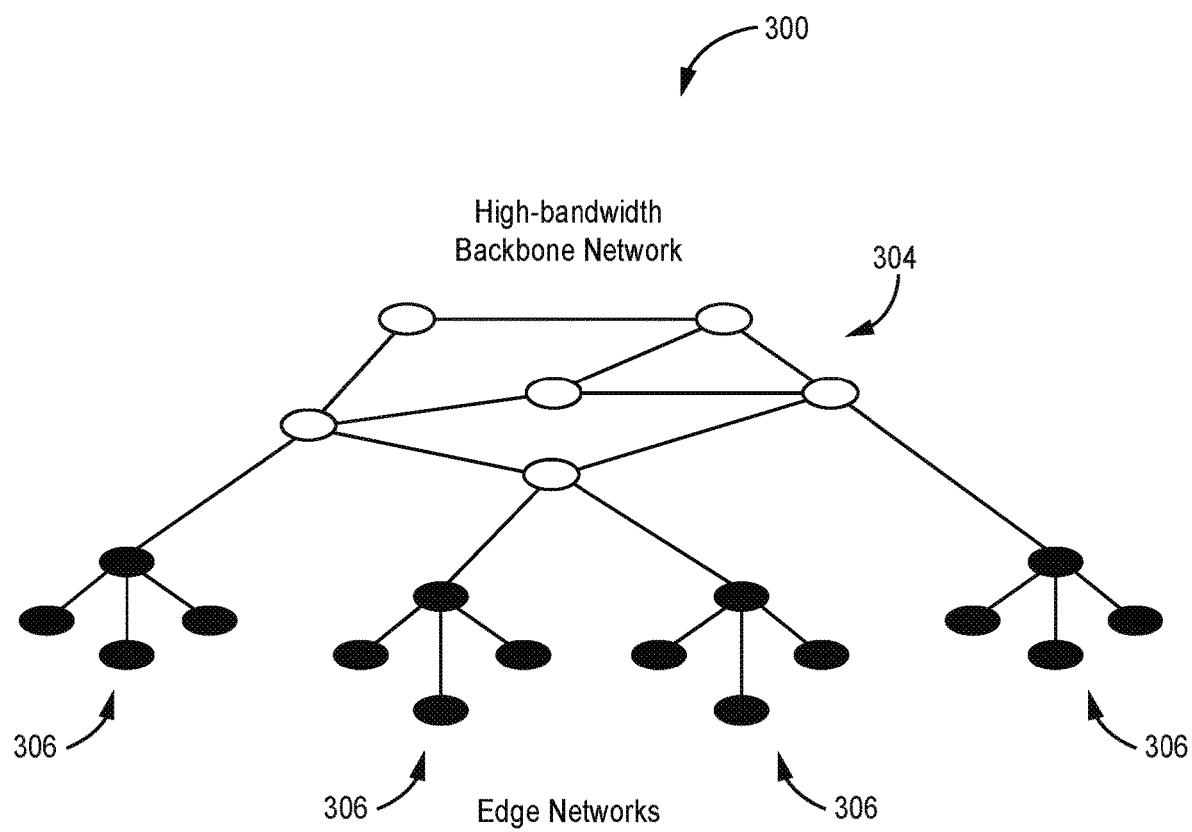
FIG. 3 is a block diagram of another example overlay network that is composed of multiple networks.

FIG. 3 is a block diagram of another example overlay network 300. In an example, the overall overlay network 300 can be divided up into different portions and each portion can be set-up and managed individually by the peers 102-1 of that portion. Example network 300 is divided into 5 different portions. The 5 portions include one core network 304 and four edge networks 306. An edge network 306 is also referred to as a tactical edge network (TEN) in the provisional Application No. 62/947,428, which is hereby incorporated herein by reference.

In an example, each peer 102-1 can be manually configured with information identifying the edge/core network 304, 306 of which that peer 102-1 is a part. When the peers 102-1 are communicatively coupled together, the peers 102-1 can identify other peers 102-1 in their core/edge network 304, 306 and implement the overlay routing protocol to set-up and manage their core/edge network independently of other core/edge networks. For example, if a peer 102-1 has information indicating that it is in the core network 304, the peer 102-1 implements its overlay network protocol based thereon.

In an example, the peers 102-1 can select neighbors and a routing protocol based on which core/edge network 304, 306 the peer 102-1 is a part of. For example, neighboring peers 102-1 for overlay links can be limited to peers 102-1 that are within the same core/edge network 304, 306. This effectively creates separate routing spaces for each network 304, 306. The exception to limiting neighbors is for peers 102-1 in an edge network 306 that are selected as leaders. The overlay protocol can select one peer 102-1 in each edge network 306 as leader for that network 306. The leader can identify one or more overlay links between itself and the core network 304. The overlay link(s) between the leader and the core network 304 are used to transfer ledger messages/information between the edge network 306 and the core network 304.

Peers 102-1 can be selected to be in the core network 304 based on the characteristics of the peer 102-1 itself, the characteristics of the peer's potential overlay links with other peers 102-1 in the core network 304, or a domain or autonomous system that the peer 102-1 belongs to. For example, if a peer 102-1 has sufficiently high processing performance and has one or more sufficiently stable and high bandwidth links to other peers 102-1 in the core network 304 the peer 102-1 can be indicated as part of the core network. In other examples, the selection of which network a peer 102-1 is a part of can be based on a domain or autonomous system that the peer 102-1 belongs to. That is, the peer 102-1 can be set as part of the same network as other peers 102-1 in that peer's 102-1 LAN.

Figure 4:
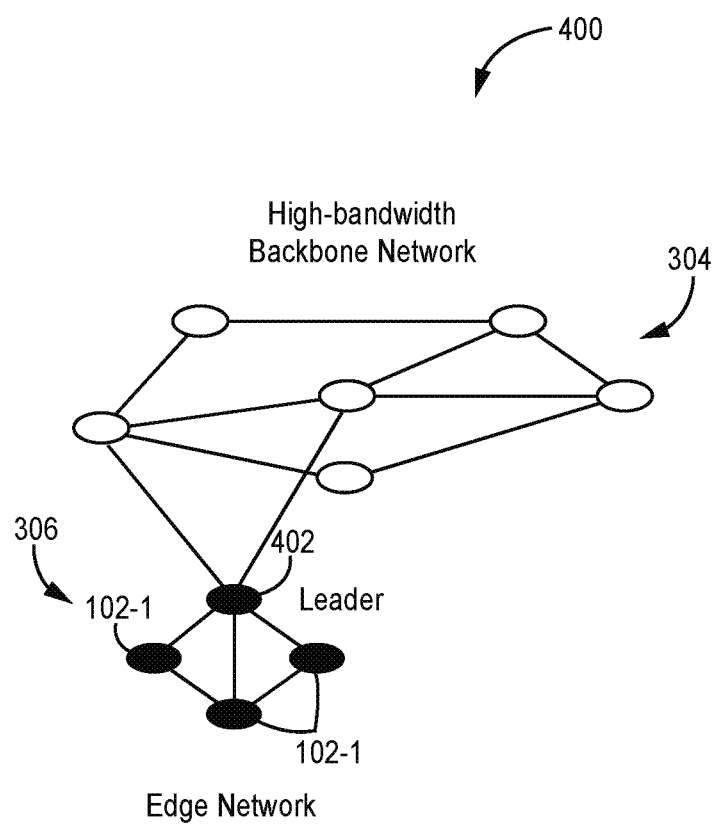
FIG. 4 is a block diagram of another example overlay network having an edge network with a leader.

FIG. 4 is a block diagram of an example overlay network 400 illustrating a leader peer 402 for an edge network 306. In an example, the peers 102-1 in an edge network elect a leader 402 for their network 306. The leader 402 is selected from the peers 102-1 within the network. The leader 402 establishes and maintains the overlay links with the core (backbone) network 304. The leader 402 leader can establish one or more overlay links with one or more core peers 102-1 and monitor these overlay links for failures. If an existing overlay link with the core network 304 becomes disconnected, the leader 402 will try to establish a new overlay link to the core 304. The peers 102-1 in the edge network 306 can select their leader 402 based on attributes that can be manually set. The attributes to be set can include characteristics of potential overlay links with the core 304 and computing resources of the peer 102-1. For example, a leader 402 can be selected as a peer 102-1 have a threshold level of computing resources and the best potential overlay link with the core 304. In an example, the leader 402 can be the gateway between the edge network 304 and the core 306.

The distributed ledger(s) maintained by the peers 102-1 includes a list of records. Each record, which is also referred to herein as a block, includes information corresponding to ledger message/information from a peer 102-1. In an example, peers 102-1 in edge networks 306 do not create blocks for the ledger themselves or participate in committing of blocks to the ledger. Instead, peers 102-1 in edge networks 306 send ledger messages/information for block creation and commitment to the core network 304. Peers 102-1 in the core network 304 then perform the computationally intensive process of creating a block(s) from the ledger message/information and committing the block(s) to the ledger. Once the block has been created, the block can be distributed back to peers 102-1 in the edge networks 306 along with peers 102-1 in the core network 304. Using this process to limit block creation to peers 102-1 in the core network 304 can be advantageous in situations where the edge networks 306 have generally lower bandwidth and/or lower computational power peers 102-1 than the core network 304.

Distribution of ledger messages/information can also be limited based on network. First, ledger messages/information in an edge network can be distributed to all peers 102-1 in the edge network of which the message/information originated. For example, a ledger message/information from a peer 102-1 in a first edge network 306 can be distributed to all other peers 102-1 in the first edge network 306. Second, ledger messages/information can be distributed to the core network 304 regardless of which network the message originated in. Thus, a ledger message originating in the first network 304 can be distributed to all the peers 102-1 in the core network 304 in addition to peers 102-1 in the first edge network 306. Third, ledger messages/information from a given edge network 306 are not distributed to peers 102-1 in edge networks 306 from which they did not originate. Thus, a ledger message/information from the first edge network 306 is distributed to all peers 102-1 in the first edge network 306 and all peers 102-1 in the core network, but that message/information is not distributed to peers 102-1 in any other edge network 306. To restrict ledger messages/information from being distributed to other edge networks 306, peers 102-1 in the core network 304 can be configured not to transmit ledger messages/information to peers 102-1 in edge networks 306. Thus, the ledger messages/information will be distributed through the first edge network 306 of origin by virtue of the overlay routing protocol implemented by the first edge network 306. The leader of the first edge network 306 will also forward the ledger message/information to the core network 306. The overlay routing protocol of the core network 304 will distribute the message/information to all peers 102-1 of the core network 304, but the peers 102-1 of the core network 304 will not distribute the message/information to any edge networks 306. Thus, distribution of the message/information will be limited to the edge network of origin and the core network 304. Limiting message/information distribution in this way is another way to reduce bandwidth and processing requirements on the edge networks 306.

In an example, distribution of the blocks created from a ledger message/information is not limited, such that blocks are distributed to all peers 102-1 in all networks 304, 306, so that all peers 102-1 can have a copy of the ledger(s) being maintained. Thus, distribution of ledger messages/information can be limited, but distribution of the blocks corresponding to those messages/information is not limited.

Figure 5:
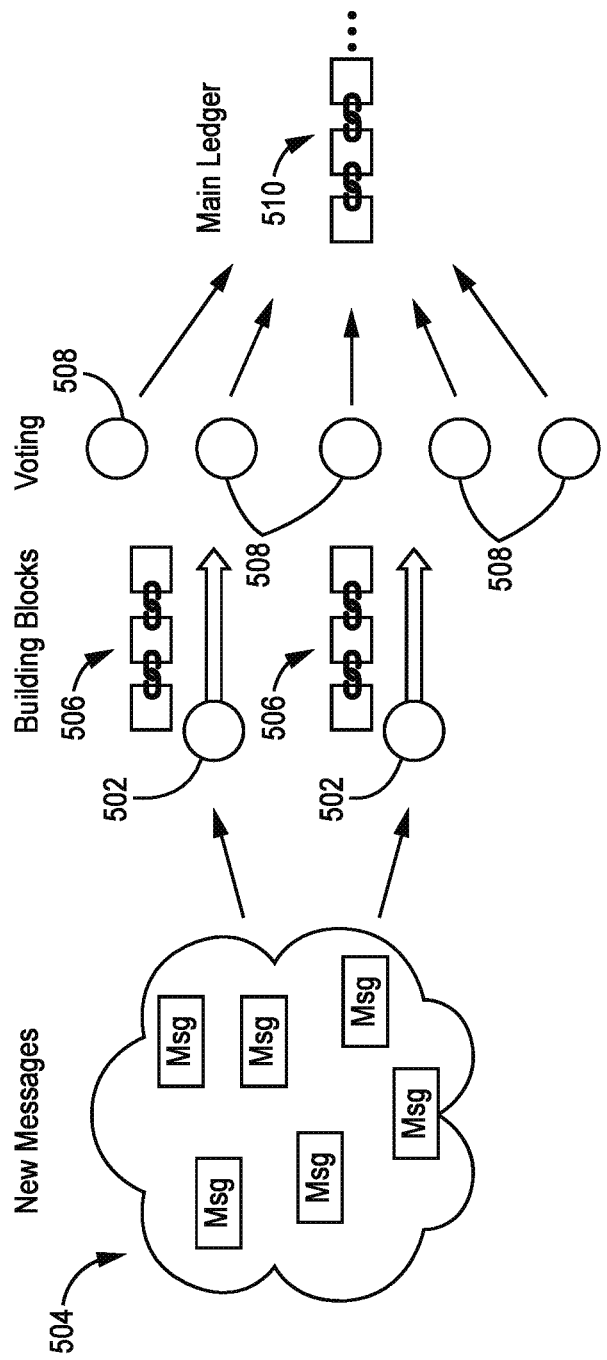
FIG. 5 is a block diagram of an example process of parallel distributed ledger construction.

FIG. 5 is a block diagram of a process of building a ledger 510 with multiple peers 102 (e.g., core peers) building blocks in parallel. The process of building a ledger (committing blocks to the ledger) is computationally intensive and has been done sequentially in previous distributed-ledger systems because each block must reference the hash of the previous block and that hash is not known until the previous block is built. The process described herein, however, builds blocks in parallel. Building blocks in parallel increases the speed at which blocks can be committed to the ledger 510 and spreads the workload out across multiple peers 102.

Initially, a plurality of block building peers 502 are selected from amongst the plurality of peers 102. In an example, the plurality of block building peers 502 are a subset of the core peers 102. The block building peers 502 operate in parallel to create blocks that capture data 504 from other peers 102 (e.g., edge peers). Each block building peer 502 receives a portion of data 504 generated by the other peers 102 that is to be committed to the ledger 510. Each block building peer 502 generates blocks to capture that block building peer's portion of the data 504. The set of data 504 to be committed to the ledger 510 is split up amongst the block building peers 502, such that each block building peer 502 is responsible for incorporating a portion of the data 504 into blocks. The portion of data 504 to be incorporated into a block by a given peer 502 is included as record data in the blocks created by that block building peer 502. The set of data 504 to be committed is split amongst the block building peers 504 so that all data 504 is captured in a block. In an example, the data 504 is not duplicated, such that each item of data 504 is captured a single time amongst the set of blocks created by the block building peers 502. In this way, the set of data 504 can be incorporated into blocks in parallel by a plurality of block building peers 502. Any number of block building peers 502 can be used.

In an example, the data 504 is divided amongst the block building peers 502 based on an origin of the data 504. In an implementation of this example, the data 504 is divided amongst the block building peers 502 based on which peer 102 created the data 504. For example, data 504 created by a first peer 102 and data 504 created by a second peer 102 are captured into blocks by a first block building peer 502 whereas data 504 created by a third peer 102 and data 504 created by a fourth peer 102 are captured into blocks by a second block building peer 504. Although the example just described has the first and second block building peers 502 capturing data 504 from two peers 102 each, a given block building peer 502 can capture data 504 from any number of peers 102 and different block building peers 502 can capture data 504 from a different numbers of peers 102. Data 504 from a single peer 102 can even be split amongst multiple block building peers 502. In some examples, the data 504 can be divided amongst the peers 502 based on the content of the data 504, such that data 504 relating to a first category (e.g., correspondence messages) is sent to a first block building peer 502 and data 504 relating to a second category (e.g., mapping data) is sent to a second block building peer 502. The data 504 can be routed from the peer 102 that generates the data 504 to the block building peer 502 assigned to capture the data 504 in any suitable manner. For example, the peer 102 generating the data 504 can be notified of the block building peer 502 assigned to capture the data 504 and can address packets with the data 504 to that block building peer 502. Alternatively, data 504 can be sent to one or more distribution peers 102 that distribute the data 504 to the appropriate block building peer 504 for incorporation into a block.

Each block building peer 502 forms a ledger fragment 506 with the blocks it creates. A ledger fragment 506 is a sequence of blocks that are linked together in accordance with the format and protocol followed by the (main) ledger 510. Each block building peer 502 generates a distinct ledger fragment 506 that includes blocks created by that block building peer 502 and which captures the portion of data 504 assigned to that block building peer 502. In this way, data 504 generated by a given peer 102 and/or corresponding to a given category is captured in a single ledger fragment 506. By splitting the data 504 and building the blocks in parallel with a plurality of block building peers 502, a plurality of ledger fragments 506 are created concurrently.

Figure 6:
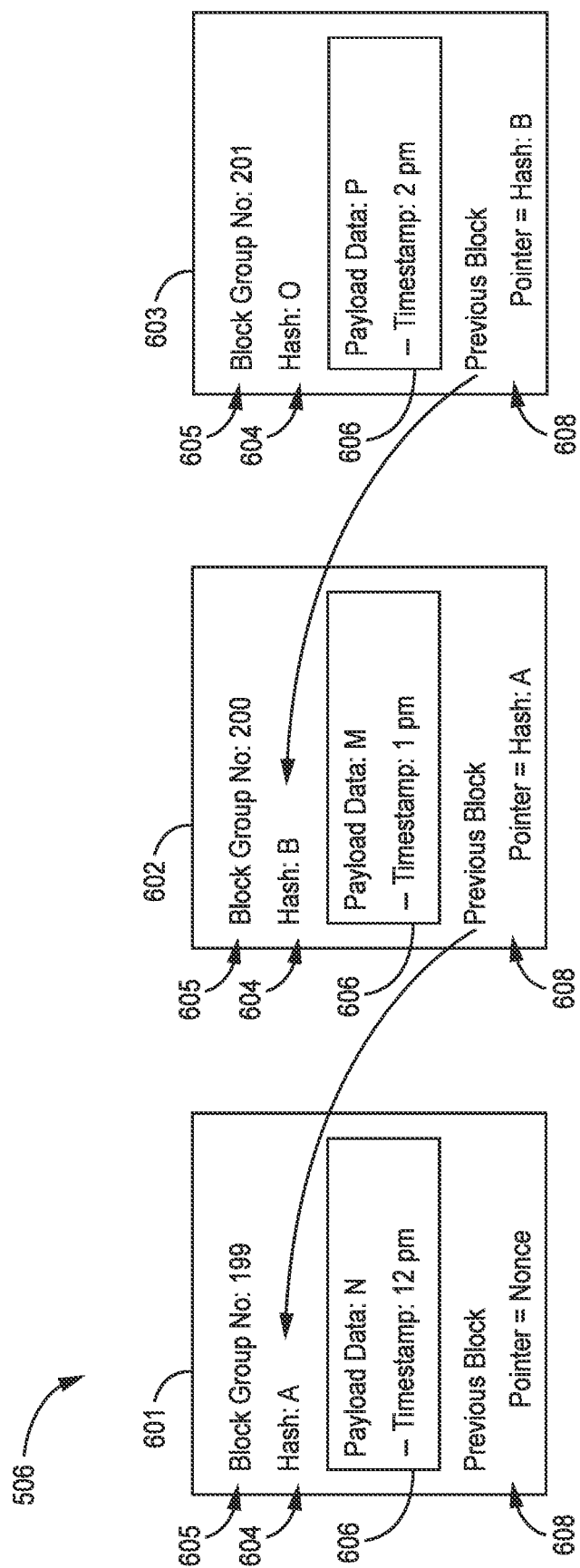
FIG. 6 is a block diagram of an example ledger fragment used in the process of parallel distributed ledger construction of FIG. 5.

FIG. 6 is a block diagram of an example ledger fragment 506 including blocks 601, 602, and 603. Each block 601, 602, 603 in the ledger fragment 506 can include a group number field 605, a hash field 604, a record data field 606, and a previous block pointer field 608. The record data field 606 in each block 601, 602, 603 includes respective portions of the data 504 being captured by the corresponding block building peer 102. The previous block pointer field 608 in the non-initial blocks 602, 603 includes a copy of the hash from the hash field 604 of the prior block 601, 602 in the fragment 506. The previous block pointer field 608 therefore references each non-initial block 602, 603 in the fragment 506 to its prior block 601, 602, forming a sequence from the blocks 601, 602, 603.

Each block 601, 602, 603 also includes a hash in the hash field 604. The hash is calculated to incorporate both the data in the record data field 606 and the hash in the previous block pointer field 608 for that block 601, 602, 603, such that any unauthorized changes to the data in the record data field 606 or the hash in the previous block pointer field 603 can be identified due to the hash in the hash data field 604 not correlating to the changed data or previous block hash. The hash function used to calculate the hash is in accordance with the protocol of the main ledger 510 and in accordance with known techniques.

The initial block 601 of the ledger fragment 506 does not have any blocks prior to it when it is created. Accordingly, the previous block pointer field 608 for the initial block 601 includes a nonce value instead of a hash value. As a nonce, the nonce value is not calculated via a hash function as the hashes are. The hash in the hash field 604 for the initial block 601 therefore incorporates the data in the record data 606 for the initial block 601 and the nonce value in the previous block pointer field 608. Subsequent blocks 602, 603 after the initial block 601 in the ledger fragment 506 include the hash of the prior block in their previous block pointer field 608.

Figure 7:
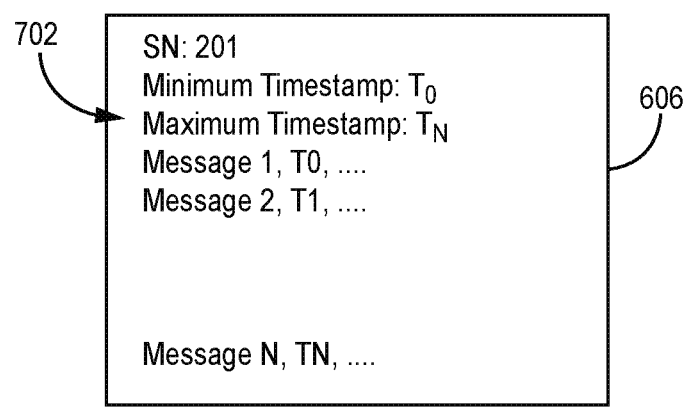
FIG. 7 is a block diagram of example record data in a block of a distributed ledger.

FIG. 7 is an illustration of example data in a record data field 606 of a block. The data 502 in the record data field 606 is data 502 generated by a peer 102 that is subsequently captured in the block as a record. The data 502 can be any desired data such as messages, mapping data (images), or other information. In an example, the data 502 in each record data field 606 includes ordering information 702. Ordering information 702 is information that indicates an order for that data 506 with respect to other data 506. In an example, the ordering information 702 in each record data field 606 indicates an order relative to the record data fields 606 of all of the other blocks in the main ledger 510. In an alternative example, the ordering information 702 in each record data field 606 indicates an order relative to a subset of the other blocks. In this alternative example, the entire set of blocks in the main ledger 510 includes multiple subsets of blocks. Each subset of blocks has respective ordering information 702 that indicates an order for the record data field 606 in that subset relative to other record data fields 606 in that subset. The ordering information 702 in one subset may not indicate an order relative to record data field 606 in other subsets, however. In the example shown in FIG. 7, the ordering information 702 is a timestamp. The timestamp can be a time that corresponds to other data 506 in the record data field 606, such as a time in which a message 704 in the record data field 606 was sent or received. In another example, the ordering information 702 can be a transaction counter that is incremented each time a transaction for a specific account (e.g., a bank account) is recorded. Other examples of ordering information 702 are also possible. The block building peers 502 can build the blocks for a given ledger fragment 506 such that the record data fields 606 are included in their respective blocks of the ledger fragment 506 in order in accordance with the ordering information 702.

Referring back to FIG. 5, ledger fragments 506 created by the block building peers 502 are incorporated into the main ledger 510 by a plurality of voting peers 508. The block building peers 502 can send the ledger fragments 506 to the plurality of voting peers 508 once the ledger fragment 506 is ready to be incorporated into the main ledger 510. A ledger fragment 506 can be considered ready to incorporate into the main ledger 510 in accordance with any suitable criteria. In an example, each ledger fragment 506 is built to include a threshold number of blocks. Once the number of blocks in the fragment 506 reaches the threshold, the fragment 506 is sent to the voting peers 508 for incorporation into the main ledger 510. In another example, each ledger fragment 506 is built to capture a subset of data 504 and blocks are added to the fragment 506 until all data from the subset is captured. Once all the data in the subset is captured, the fragment 506 can be sent to the voting peers 508 for incorporation into the main ledger 510.

In any case, ledger fragments 506 are sent from the block building peers 502 to the voting peers 508 for incorporation into the main ledger 510. The voting peers 508 are a subset of peers 102 responsible for appending the ledger fragments 506 onto the main ledger 510. In an example, the voting peers 508 are distinct from the block building peers 502, such that a given peer 102 does not operate as both a block building peer 502 and a voting peer 508. This can be done so that blocks built by a block building peer 502 can be validated by separate voting peers 508 prior to incorporation into the main ledger 510. In an example, the peers 102 selected as block building peers 502 and the peers 102 selected as voting peers 508 can be updated overtime (e.g., periodically) to rotate through different peers 102 as block building peers 502 and voting peers 508. In an example, selection of a peer 102 as a block building peer 502 can be based on characteristics of the peer 102, such as available data processing bandwidth and available network bandwidth among other things, wherein peers 102 with larger data processing bandwidth and/or available network bandwidth can be prioritized.

The voting peers 508 can cooperate to validate each block of a ledger fragment 506 received from a block building peer 502. Once each block of the fragment 502 is validated, the ledger fragment 502 can be appended to the main ledger 510. A ledger fragment 506 is appended to the main ledger 510 with the use of a linking block.

Figure 8:
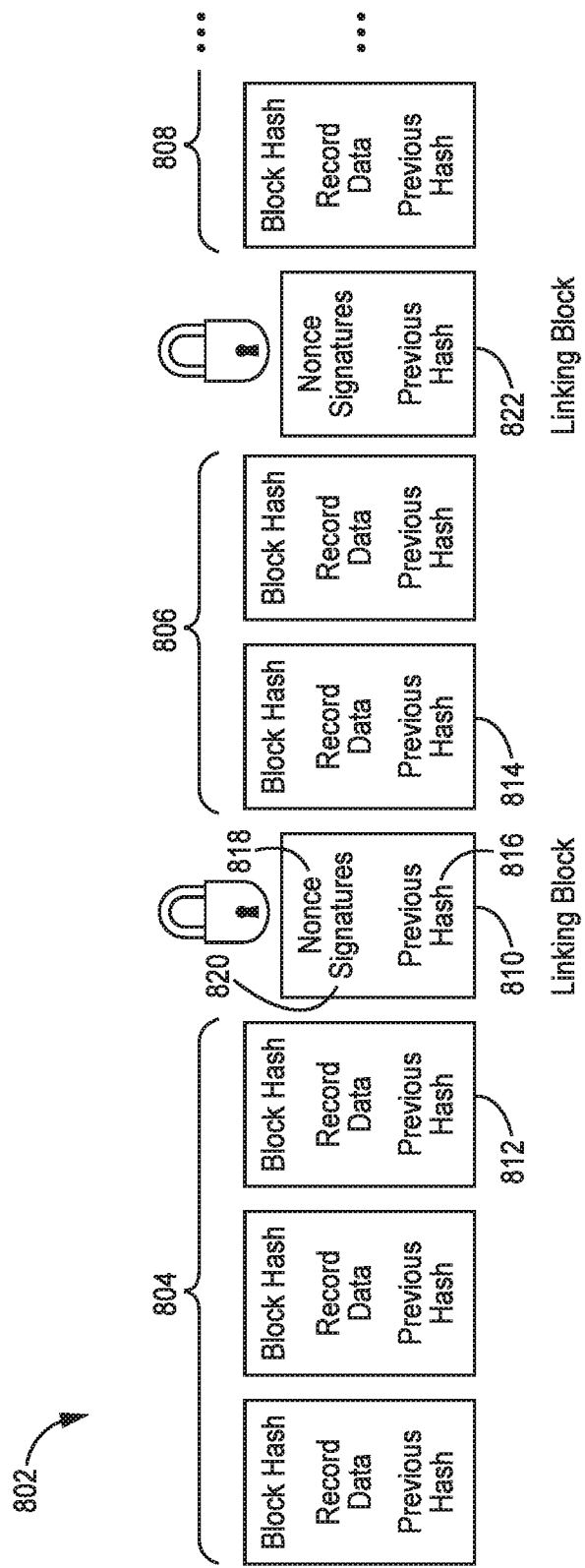
FIG. 8 is a block diagram of an example distributed ledger constructed using the process of parallel ledger construction of FIG. 5.

FIG. 8 is a block diagram of an example ledger 802 including a first ledger fragment 806 and a second ledger fragment 808 appended to what was previously the main ledger 804. Appending one or more ledger fragments 806, 808 to a main ledger 804 creates a new main ledger 802 that includes the previous main ledger 804 and the ledger fragment(s) 806, 808.

As mentioned above, a linking block 810 is used to link a ledger fragment 806 to the main ledger 804. A linking block 810 is referred to in provisional Application No. 62/947,428 as a locking block. A linking block 810 includes a previous block pointer field 816 and a block hash field 818. In an example, the linking block 810 does not include any record data 506. The linking block 810 links the ledger fragment 806 to the main ledger 804 by linking between an end block 812 of the main ledger 804 and an initial block 814 of the ledger fragment 806. To link to the end block 812 of the main ledger 804, the linking block includes the hash from the hash field of the end block 812 in its previous block pointer field 816. To link to the initial block 814 of the ledger fragment 806, the linking block 810 includes in its hash field 818, the nonce value in the previous block pointer field of the initial block 814. In this way, the linking block 810 provides the link between the end block 812 of the main ledger 804 and the initial block 814 of the ledger fragment 608. Use of such a linking block 810 enables a ledger fragment 806 made up of multiple already created blocks to be appended to the main ledger 804 without having to re-build any of the already created blocks. The linking block 810 can be signed 820 by multiple (e.g., all) voting peers 508 so that any unauthorized changes to the linking block 802 can be identified. Additional ledger fragments 808 can be appended with respective linking blocks 822.

In an example, one or more of the block building peers 502 are leaders in an edge network that is creating a forked ledger due to, for example, network disconnection. After network reconnection, the forked ledger can be merged as a ledger fragment as discussed above. More detail regarding forked ledgers is provided in co-pending U.S. patent application Ser. No. 17/006,064, filed on Aug. 28, 2020 and titled "ZERO-LOSS MERGING OF DISTRIBUTED LEDGERS", which is hereby incorporated herein by reference.

Figure 9:
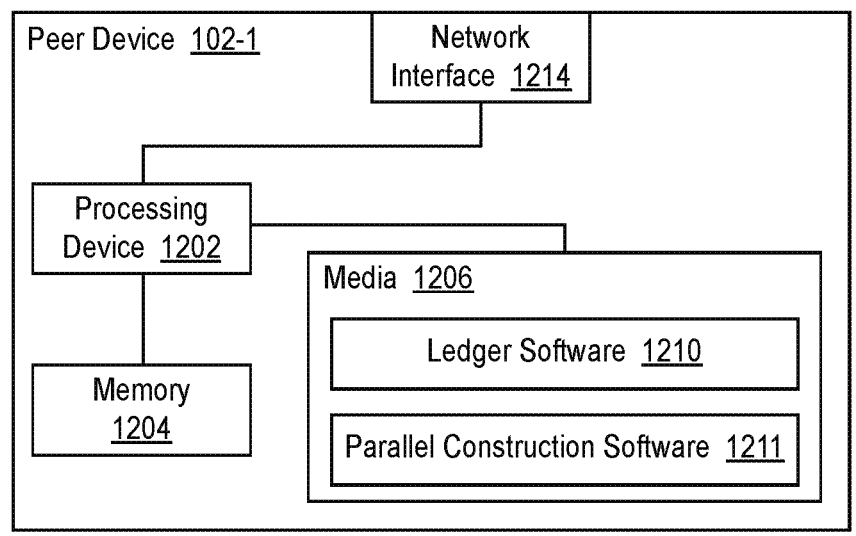
FIG. 9 is a block diagram of an example ledger peer.

FIG. 9 is a block diagram of an example peer device 102-1 implementing the ledger protocol. In an example, the peer device 102-1 can be an end-user device (e.g., a mobile phone, tactical radio). In another example, the peer device 102-1 can be a networking device (e.g., a router) configured to implement routing protocols (e.g., IP) for the network 100 in addition to the ledger protocol. In yet another example, the peer device 102-1 can be a standalone network appliance installed within the (IP) network 100 to implement the ledger protocol in the network 100.

In any case, the peer device 102-1 has ledger software 1210 thereon to implement the ledger protocol described herein. The ledger software 1210 includes parallel block creation software 1211 to implement the parallel block creation processes described herein. The peer device 102-1 can include one or more processing devices 1202 to execute the instructions of the ledger software 1210. The one or more processing devices 1102 can include a general-purpose processor or a special purpose processor. The instructions of the ledger software 1210 are stored (or otherwise embodied) on or in an appropriate storage medium or media 1206 (such as a flash or other non-volatile memory) from which the instructions are readable the processing device(s) 1202 for execution thereby. The peer device 102-1 also includes memory 1204 that is coupled to the processing device(s) 1202 for storing instructions (and related data) during execution by the processing device(s) 1202. Memory 1204 comprises, in one implementation, any suitable form of random-access memory (RAM) now known or later developed, such as dynamic random-access memory (DRAM). In other implementations, other types of memory are used.

The instructions of the ledger software 1210, when executed by the one or more processing devices 1202, cause the one or more processing devices 1202 to perform the actions (or a portion thereof) of a peer 102-1 described herein. This includes the actions relating to creating and maintaining ledgers, sending and routing ledger messages/information, implementing an overlay protocol, and building blocks in parallel as described herein.

The peer device 102-1 also includes one or more network interfaces 1214 for communicating with other ledger and non-ledger devices 102 in the network 100. The one or more network interfaces 1214 can be coupled to the one or more processing devices 1202. The one or more network interfaces 1214 can include wired and/or wireless interfaces such as an Ethernet interface, a satellite transceiver, an IEEE 802.11 transceiver, a cellular transceiver, or other interface.

Figure 10:
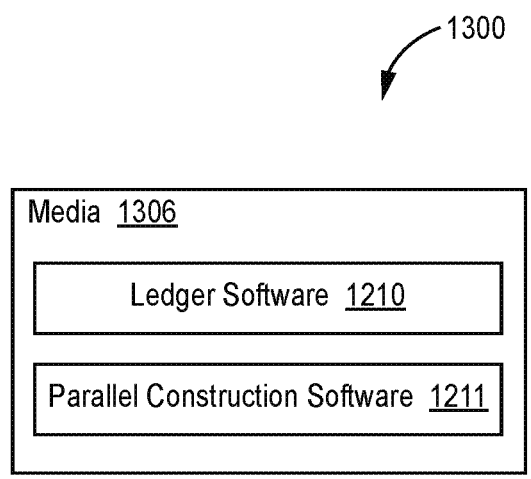
FIG. 10 is a block diagram of an example program product including ledger software for implementing the fork and merge processes described herein.

FIG. 10 is a block diagram of an example software product 1300 that includes ledger software 1210. The software product 1300 includes a computer readable medium 1302 including ledger software 1210 that can be loaded onto an appropriate hardware device. The ledger software 1210 includes instructions that are stored or otherwise embodied on the computer readable medium 1302. The ledger software 1210 can be loaded onto an appropriate hardware device, such as peer 1200, for the hardware device to execute the instructions and perform the functionality (or a portion thereof) of a peer device 102-1 as described herein. The computer readable medium 1202 on which the ledger software 1210 is stored can be any suitable computer readable media, such as a magnetic media such as a hard disk drive (HDD), optical media such as a CD, DVD, Blu-Ray disk, or a non-volatile electric media such as a solid-state drive (SDD), flash media, or EEPROM. Such computer readable media can be standalone media (e.g., a USB stick or CD) or can be computer readable medium within a computing device (e.g., a server or network accessible storage).

What is claimed is:

1. A program product comprising:
    a non-transitory processor readable medium having software stored thereon, the software, when executed by one or more processing devices, configured to:
    generate a ledger fragment by:
    generating a first block having first data in a first record data field, a nonce value in a first previous block pointer field, and a first hash in a first hash field, wherein the first hash is calculated based on the first data and the nonce value; and
    generating a second block having second data in a second record data field, the first hash in a second previous block pointer field, and a second hash in a second hash field, wherein the second hash is calculated based on the second data and the second hash; and
    append the ledger fragment to a main ledger, the main ledger including a plurality of blocks in a sequence defining an end block at an end of the sequence, the end block having third data in a third record data field, a third previous block pointer field, and a third hash that is calculated based on the third data, wherein append the ledger fragment to the main ledger includes:
    generate a linking block, the linking block positioned between the first block of the ledger fragment and the end block of the main ledger, the linking block including the third hash in a fourth previous block pointer field and the nonce value in a fourth hash field; and
    sign the linking block by a plurality of voting peers.

2. The program product of claim 1, wherein the software is configured to:
    coordinate with one or more other block building peers such that the one or more other block building peers generate one or more other ledger fragments, wherein the one or more other ledger fragments are appended to the main ledger with a respective linking block to generate a single ledger from the main ledger, the ledger fragment, and the one or more other ledger fragments, wherein each respective linking block is signed by a plurality of voting peers.

3. The program product of claim 2, wherein the software is executed by a first block building peer and is configured to:
    receive data to be added to the main ledger; and
    divide the data between the first block building peer and one more other block building peers such that the first block budding peer and the one or more other block budding peers include the data assigned thereto in their respective ledger fragment, wherein the data is incorporated into the main ledger when the ledger fragments are appended to the main ledger.

4. The program product of claim 3, wherein divide the data includes divide the data between the first block building peer and the one or more other block building peers based on an origin of the data, such that data from a common origin is included in a single ledger fragment.

5. The program product of claim 3, wherein divide the data includes divide the data between the first block building peer and the one or more other block building peers based on a category of the data; such that data in a common category is included in a single ledger fragment.

6. The program product of claim 2, wherein none of the one or more other block building peers, nor the first block building peer are included in the plurality of voting peers.

7. The program product of claim 1, wherein the linking block does not include any data in a record data field.

8. A peer device comprising:
    one or more processing devices;
    non-transitory storage media communicatively coupled to the one or more processing devices, the storage media including software stored thereon, the software, when executed by the one or more processing devices, configured to:
    generate a ledger fragment by:
    generating a first block having first data in a first record data field, a nonce value in a first previous block pointer field, and a first hash in a first hash field, wherein the first hash is calculated based on the first data and the nonce value; and
    generating a second block having second data in a second record data field, the first hash in a second previous block pointer field, and a second hash in a second hash field, wherein the second hash is calculated based on the second data and the second hash; and append the ledger fragment to a main ledger, the main ledger including a plurality of blocks in a sequence defining an end block at an end of the sequence, the end block having third data in a third record data field, a third previous block pointer field, and a third hash that is calculated based on the third data, wherein append the ledger fragment to the main ledger includes:

generate a linking block; the linking block positioned between the first block of the ledger fragment and the end block of the main ledger, the linking block including the third hash in a fourth previous block pointer field and the nonce value in a fourth hash field; and sign the linking block by a plurality of voting peers.

9. The device of claim 8, wherein the software is configured to:

coordinate with one or more other block building peers such that the one or more other block building peers generate one or more other ledger fragments, wherein the one or more other ledger fragments are appended to the main ledger with a respective linking block to generate a single ledger from the main ledger, the ledger fragment, and the one or more other ledger fragments, wherein each respective linking block is signed by a plurality of voting peers.

10. The device of claim 9, wherein the software is configured to:

receive data to be added to the main ledger; and divide the data between the first block building peer and one more other block building peers such that the first block building peer and the one or more other block building peers include the data assigned thereto in their respective ledger fragment, wherein the data is incorporated into the main ledger when the ledger fragments are appended to the main ledger.

11. The device of claim 10, wherein divide the data includes divide the data between the peer device and the one or more other block building peers based on an origin of the data, such that data from a common origin is included in a single ledger fragment.

12. The device of claim 9, wherein divide the data includes divide the data between the first block building peer and the one or more other block building peers based on a category of the data, such that data in a common category is included in a single ledger fragment.

13. The device of claim 12, wherein none of the one or more other block building peers nor the peer device are included in the plurality of voting peers.

14. The device of claim 8, wherein the linking block does not include any data in a record data field.

15. A method for constructing a ledger comprising:

sending data to be committed to the ledger to a plurality of block building peers;

generating a first ledger fragment at a first of the plurality of block building peers and a second ledger fragment at a second of the plurality of block building peers, wherein the first ledger fragment captures a first portion of the data and the second ledger fragment captures a second portion of the data, each of the first and second ledger fragments including:

an initial block having first data in a first record data field, a nonce value in a first previous block pointer field, and a first hash in a first hash field, wherein the first hash is calculated based on the first data and the nonce value; and one or more additional blocks, each additional block having respective data in a respective record data field, a hash of a prior block in a respective previous block pointer field, and its own hash in a respective hash field, wherein its own hash is calculated based on the respective data and the respective hash of the prior block;

appending the first and second ledger fragments to a main ledger, the main ledger including a plurality of blocks in a sequence defining an end block at an end of the sequence, the end block having third data in a third record data field, a third previous block pointer field, and a third hash that is calculated based on the third data, wherein appending the first ledger fragment includes:

generating a first linking block, the first linking block positioned between the initial block of the first ledger fragment and the end block of the main ledger, the first linking block including the third hash in a fourth previous block pointer field and the nonce value from the hash field of the initial block of the first ledger fragment in a fourth hash field; and signing the first linking block by a plurality of voting peers;

wherein appending the second ledger fragment includes:

generating a second linking block, the second linking block positioned between the initial block of the second ledger fragment and a current end block of the current main ledger, the second linking block including a hash from the current end block in a fifth previous block pointer field and the nonce value from the hash field of the initial block of the second ledger fragment in a fourth hash field; and signing the second linking block by a plurality of voting peers.

16. The method of claim 15, wherein sending data to be committed includes sending distinct portions of the data to different block building peers, such that the first portion of data captured in the first ledger fragment is distinct from the second portion of data in the second ledger fragment.

17. The method of claim 16, wherein the plurality of voting peers are distinct from the plurality of block building peers such that no single peer device is among the plurality of voting peers and the plurality of block building peers at the same time.

18. The method of claim 17, comprising:

updating which peers are among the plurality of voting peers and the plurality of block building peers.

19. The method of claim 15, wherein the first and second linking blocks do not include any data in a record data field.

20. The method of claim 15, wherein sending data to be committed includes sending data to respective block building peers of the plurality of block building peers based on a peer that generated the data such that data generated by a respective peer is sent to a single block building peer.

21. The method of claim 15, wherein sending data to be committed includes sending data to respective block building peers of the plurality of block building peers based on a category of the data such that data in a respective category is sent to a single block building peer.

* * * * *